United States Patent Office

2,875,208
Patented Feb. 24, 1959

2,875,208

PROPYNYL SULFENAMIDES

John J. D'Amico, Nitro, W. Va., assignor to Monsanto Chemical Company, St. Louis, Mo., a corporation of Delaware No Drawing. Application December 28, 1956
Serial No. 631,070

7 Claims. (Cl. 260—306.6)

The present invention relates to a class of new chemical products useful as herbicides and also as accelerators of the vulcanization of rubber as will hereinafter be shown. The invention also comprises a method of producing the new products. The products may be described broadly as thiazolesulfenamides and can be schematically represented by the general formula

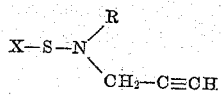

wherein X represents an aryl thiazole nucleus which may contain a nitro, chloro, phenyl, methoxy, alkoxy or alkyl group substituted in the benzene ring, and R represents hydrogen, an alkyl, aralkyl or a cycloalkyl group. Preferably, the alkyl group mentioned contains from one to and including five carbon atoms, such as methyl, ethyl, propyl, isopropyl, butyl, isobutyl, and amyl groups. A preferred method of obtaining the new products is set forth in the following examples of the invention.

EXAMPLE 1.—PRODUCT A

*N-isopropyl-N-(2-propynyl)-2-benzothiazolesulfenamide*

A solution of the sodium salt of 2-mercaptobenzothiazole was prepared by dissolving 43 parts (0.25 mole) of 97% mercaptobenzothiazole in 50 parts of water containing 40 parts (0.25 mole) of 25% sodium hydroxide solution. The solution preferably is filtered to remove any insoluble particles therefrom. Thereupon 97.2 parts (1.0 mole) of N-isopropyl-2-propynylamine were added over a period of time while agitating the mixture. When all of the amine had been added, 60 parts of 25% sulfuric acid were slowly added with stirring until thorough admixture resulted. Next 22.3 parts (0.3 mole) of sodium hypochlorite contained in 150 parts of water were added slowly while maintaining the temperature of the mass between 25–30° C. by suitable cooling means as required. Agitation was continued for about an hour after all the hypochlorite had been added. Then 2 parts of sodium sulfite were added to remove any unreacted oxidizing agent from the reaction. The reaction mixture was then extracted with a suitable solvent, such as ether, in which any by-product di- or polysulfides are insoluble, the extract was filtered and the ether solution washed with water to neutrality of the water washings. The extract was then dried by means of anhydrous sodium sulfate to remove any water droplets present and the ether was then removed in vacuo at a temperature below 30° C. A semi-solid which was dark amber in color was obtained in 54.8% yield. The product was soluble in acetone, ether, benzene, chloroform, ethanol, ethyl acetate, and heptane. The expected product, of empirical formula $C_{13}H_{14}N_2S_2$, was confirmed by analysis for nitrogen content which showed 10.41% present as compared with 10.67% required for the formula shown.

EXAMPLE 2.—PRODUCT B

*5-chloro-N-isopropyl-N-(2-propynyl)-2-benzothiazolesulfenamide*

Proceeding in the manner as described in Example 1 except that 50.4 parts of 5-chloromercaptobenzothiazole in 100 parts of water were used in place of the mercaptobenzothiazole there employed, and treating the product as there described, a tan colored solid product, M. P. 43–45° C., was obtained in 54% yield which possessed the same characteristics in solvents as the product of Example 1. Identification of the product of this example was confirmed by analysis as possessing the formula $C_{13}H_{13}ClN_2S_2$ as is evident from the results that follow:

|  | Percent Found | Percent Theory |
| --- | --- | --- |
| nitrogen | 9.80 | 9.44 |
| chlorine | 12.41 | 11.94 |

EXAMPLE 3.—PRODUCT C

*N-isopropyl-4-methyl-N-(2-propynyl)-2-benzothiazolesulfenamide*

As another example of the invention, the product named immediately above was obtained by forming a solution of 45.3 parts (0.25 mole) of 4-methyl mercaptobenzothiazole in 25 parts of water containing 40 parts (0.25 mole) of 25% sodium hydroxide. Thereupon, 121.0 parts (1.25 mole) of N-isopropyl-2-propynylamine were slowly added with thorough agitation whereupon 50 parts of 25% sulfuric acid were added over a period of time and then 22.5 parts of sodium hypochlorite solution (0.3 mole as a 16.1% solution) were slowly added while maintaining the temperature of the mixture between 25–30° C. Agitation was continued for about an hour after all the reactants had been added. Thereupon, 4 parts of sodium sulfite were added to destroy any residual oxidizing agent present. After cooling to a maximum temperature of 25° C. the mass was extracted with ether, the ethereal solution was filtered, washed with water to neutrality, dried and the solvent removed as described in Example 1. An amber colored oil was obtained in 69.5% yield. This product was soluble under same conditions as was product A. Identification of the product as $C_{14}H_{16}N_2S_2$ and as named in this example was confirmed by analysis which produced as results:

|  | Percent Found | Percent Theory |
| --- | --- | --- |
| nitrogen | 9.91 | 10.15 |

EXAMPLE 4.—PRODUCT D

*6-ethoxy-N-isopropyl-N-(2-propynyl)-2-benzothiazolesulfenamide*

Again proceeding as described in Example 3 hereof, but using 52.8 parts (0.25 mole) of 6-ethoxy mercaptobenzothiazole in place of the 4-methyl mercaptobenzothiazole used in the said example and maintaining the reaction temperature at 45–50° C., there was obtained a cream colored solid melting at 90–91° C. after recrystallization from ethyl alcohol and displaying the same characteristics in solvents as pointed out in the three previous examples. The product was identified as the one named in this example by analysis, confirming the formula $C_{15}H_{18}N_2OS_2$ as is shown from the results:

|  | Percent Found | Percent Theory |
|---|---|---|
| nitrogen | 9.17 | 9.14 |
| sulfur | 20.70 | 20.93 |

Further examples of the new compounds comprise N-methyl-N-(2-propynyl)-2-benzothiazolesulfenamide, N-ethyl-N-(2-propynyl)-2-benzothiazolesulfenamide, N-isobutyl-N-(2-propynyl)-2-benzothiazolesulfenamide, N-isoamyl-N-(2-propynyl)-2-benzothiazolesulfenamide, N-benzyl-N-(2-propynyl)-2-benzothiazole-sulfenamide, N-cyclohexyl-N-(2-propynyl)-2-benzothiazolesulfenamide and N-allyl-N-(2-propynyl)-2-benzothiazolesulfenamide. Most of the intermediates required have been described and others may be prepared by application of known principles. For example, N-isopropyl-2-propynylamine may be prepared as follows: To a stirred solution containing 591 grams (10.0 moles) of isopropylamine and 400 ml. of water, 5 moles of 3-bromo-1-propyne was added dropwise at 47–65° C. over a three hour period. The stirred reaction mixture was heated at 60–70° C. for four hours. After cooling to 10° C., 500 grams of 50% aqueous sodium hydroxide was added over a ten minute period. The reaction mixture was stirred for one additional hour and the sodium halide was removed by filtration. The top organic layer was dried over caustic and excess isopropylamine was removed by distillation. The distillation of the residue through a 4-foot Vigreux-type column gave N-isopropyl-2-propynylamine, B. P. 110–111° C., $n_D^{25}$ 1.4230, analyzing 14.54% nitrogen as compared to 14.42% calculated for $C_6H_{11}N$.

The products of the present invention as described hereinbefore have been found effective as accelerators of the vulcanization of rubber as are shown by the following examples which are typical of the class of products. Mixes were prepared in the well known manner according to the recipes shown below:

| Stock | A | B | C |
|---|---|---|---|
|  | Parts by weight | | |
| Smoked sheets rubber | 100 | 100 | 100 |
| Carbon black (Philblack O) | 50 | 50 | 50 |
| Zinc oxide | 5 | 5 | 5 |
| Stearic acid | 3 | 3 | 3 |
| Saturated hydrocarbon softener | 3 | 3 | 3 |
| Sulfur | 2.5 | 2.5 | 2.5 |
| Antioxidant | 1.5 | 1.5 | 1.5 |
| Product A | 0.5 | | |
| Product B | | 0.5 | |
| Product D | | | 0.5 |

The stocks so compounded were cured in the usual manner by heating in a press for different periods of time at 144° C. The physical properties of the vulcanizates are set forth below:

TABLE I

|  | Time of cure | Stock A | Stock B | Stock C |
|---|---|---|---|---|
| Modulus of Elasticity in lbs./in.² at 300% Elongation. | 30 | 1,930 | 1,720 | 1,940 |
|  | 45 | 2,470 | 2,490 | 1,960 |
|  | 60 | 2,470 | 2,430 | 1,930 |
| Tensile at break in lbs./in.² | 30 | 3,620 | 3,300 | 3,820 |
|  | 45 | 3,460 | 3,780 | 3,740 |
|  | 60 | 3,710 | 3,660 | 3,540 |
| Mooney scorch, mins. for 10 point rise above minimum value | | 28 | 22.8 | 11.8 |

Additionally, another characteristic test was carried out in which product A was tested in a typical tread stock, additionally containing a retarder of vulcanization. As the formulation there was employed a mix comprising 100 parts of smoked sheet rubber, 50 parts of carbon black (Philblack O), 5 parts of zinc oxide, 3 parts of stearic acid, 3 parts of saturated hydrocarbon softener, 2.5 parts of sulfur, 0.5 part of product A, and 1.5 parts of N-nitroso diphenylamine, a retarder particularly effective with sulfenamide accelerators. The stock was cured for 45 minutes in a press at 144° C. and compared with a similarly prepared and cured stock but containing, in place of product A, an equal weight of a commercial sulfenamide delayed action accelerator. The test results obtained were as follows:

TABLE II

|  | Product A | Commercial Benzothiazole-sulfenamide |
|---|---|---|
| Modulus of Elasticity in lbs./in.² at 300% Elongation | 2,243 | 2,206 |
| Tensile at break in lbs./in.² | 4,100 | 4,063 |
| Mooney scorch at 121° C | 74 | 43 |

It is intended to cover all changes and modifications of the examples of the invention herein chosen for purposes of disclosure which do not constitute departures from the spirit and scope of the invention.

What is claimed is:

1. As a new compound a propynyl-2-benzothiazolesulfenamide having the structure

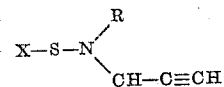

wherein R is selected from the group consisting of hydrogen, alkyl, allyl, benzyl and cyclohexyl groups and X represents a member of the group consisting of an aryl thiazole radical and nitro, chloro, phenyl, lower alkoxy and lower alkyl substituted derivatives thereof in which the substitution is for hydrogen in a benzene ring of a phenylene radical.

2. As a new compound a propynyl-2-benzothiazolesulfenamide having the structure

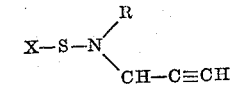

wherein R represents an alkyl group containing not more than five carbon atoms and X represents the benzothiazolyl radical.

3. As a new compound a propynyl-2-benzothiazolesulfenamide having the structure

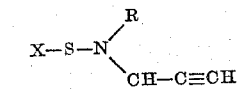

wherein R represents a hydrocarbon group containing not more than six carbon atoms at least one of which is saturated and X represents an aryl thiazole radical the aryl group of which consists of carbon and hydrogen, is a member of the benzene series and contains not more than 12 carbon atoms.

4. As a new compound N-isopropyl-N-(2-propynyl)-2-benzothiazolesulfenamide.

5. As a new compound 5-chloro-N-isopropyl-N-(2-propynyl)-2-benzothiazolesulfenamide.

6. As a new compound N-isopropyl-4-methyl-N-(2-propynyl)-2-benzothiazolesulfenamide.

7. As a new compound 6-ethoxy-N-isopropyl-N-(2-propynyl)-2-benzothiazolesulfenamide.

References Cited in the file of this patent

UNITED STATES PATENTS

| 2,339,002 | Cooper | Jan. 11, 1944 |
| 2,441,223 | Harman | May 11, 1948 |
| 2,560,021 | Smith | July 10, 1951 |